United States Patent Office 2,839,405
Patented June 17, 1958

2,839,405
INORGANIC SALT ANTIFOGGANTS FOR PHOTOGRAPHIC EMULSIONS

Jean Elmore Jones, Rochester, N. Y., assignor to Eastman Kodak Company, Rochester, N. Y., a corporation of New Jersey No Drawing. Application March 8, 1955
Serial No. 493,047

3 Claims. (Cl. 96—107)

This invention relates to fog inhibiting agents and stabilizers for photographic emulsions and to photographic emulsions containing them.

It is well known that photographic emulsions on storage tend to lose sensitivity and to become spontaneously developable without exposure to light. There is normally a detectable amount of the silver salt reduced during development in the areas where no exposure was given; this is commonly called "fog," and sometimes called "chemical fog" where it is necessary to distinguish between it and the effects of accidental exposure to radiation; in this invention, I am not concerned with the latter.

Fog depends both on the emulsion and the conditions of development; for a given emulsion it increases with the degree of development. With constant development conditions, it tends to increase with time, temperature and relative humidity of storage conditions; it is common practice to make accelerated tests of the stability of photographic emulsions by storage at increased temperature or humidity, or both. It is, of course, desirable to have emulsions as stable as possible under the conditions of high temperature and humidity which may occur in tropical climates, for example. Fog usually appears over the whole area of the sensitive coating, but when severe, it frequently is non-uniform. Fog may also be caused by exposure to chemicals, for example, hydrogen sulfide and other reactive sulfur compounds, hydrogen peroxide vapor, and strongly reducing materials. While antifoggants and stabilizers may protect, to some extent, against such effects, it is normally understood that an antifoggant protects against spontaneous growth of fog during prolonged storage or storage at high temperatures and humidities, or during development to maximum contrast and speed, or both.

Fog inhibitors have for the most part been organic compounds, the simple inorganic salts not having been used for this purpose to any extent.

I have found that certain water-soluble inorganic acid salts exert an initial anti-foggant action in silver bromoiodide emulsions and also have remarkably good antifoggant action during incubation of the coatings. I have also found that these salts are effective for inhibiting fog and stabilizing silver bromoiodide emulsions which have been sensitized with alkylene oxide polymers. Other addenda may also be employed in the emulsions so stabilized as described hereinafter.

The inorganic salts which I employ are water-soluble inorganic acid salts of cadmium, cobalt, manganese and zinc such as the chlorides, bromides, nitrates and sulfates. Examples of the compounds which I may employ are as follows:

Cadmium chloride, $CdCl_2$
Cadmium nitrate, $Cd(NO_3)_2 \cdot 4H_2O$
Cobalt nitrate, $Co(NO_3)_2 \cdot 6H_2O$
Manganese chloride, $MnCl_2 \cdot 4H_2O$
Manganese sulfate, $MnSO_4 \cdot H_2O$
Zinc chloride, $ZnCl_2$
Zinc, nitrate, $Zn(NO_3)_2 \cdot 6H_2O$
Zinc sulfate, $ZnSO_4 \cdot 7H_2O$ These salts are effective in the range of from about 10 grams to about 30 grams per gram mole of silver bromoiodide in the emulsion.

The alkylene oxide polymers used to sensitize the emulsions may be of various types. The alkylene oxides from which the polymers are derived contain from 2 to 4 carbon atoms, e. g., ethylene oxide, propylene oxide and butylene oxide. The preparation of polymers from these compounds is described in Ellis, The Chemistry of Synthetic Resins (1935), pages 990 to 994. These compounds are also referred to as polyalkylene glycols and their use as sensitizers for silver halide emulsions is described in U. S. Patents 2,423,549 and 2,441,389.

Various derivatives of alkylene oxides may also be used to sensitize the silver halide emulsions, e. g., condensation products of alkylene oxide with glycols, such as those having from 8 to 18 carbon atoms as described in U. S. Patent 2,240,472 and British Patent 443,559, as well as condensation products of alkylene oxides with aliphatic alcohols, aliphatic acids and aliphatic amines, and with phenols, that is, polyalkylene ethers, esters and amides, the preparation of which is described in U. S. Patent 1,970,578, and condensation products of alkylene oxides with hexitol ring dehydration products, as described in U. S. Patent 2,400,532.

In each case the polyalkylene oxide or derivative of alkylene oxide should have a molecular weight of at least 300 and preferably a molecular weight of 1500 to 4000 or more.

The addition to the emulsion of azaindenes especially 4-hydroxy-6-alkyl - 1,3,3a,7 - tetraazaindenes, of which 4-hydroxy - 6 - methyl - 1,3,3a,7 - tetraazaindene is an example (Zeit, wiss Phot. 47, 1952, page 2), along with the soluble inorganic salt, tends to stabilize the emulsion toward speed losses on incubation.

The principal purpose of my invention is to provide means for maintaining the sensitivity and fog of silver bromoiodide emulsions at or close to initial optimum values under conditions of high temperature or humidity or both. Preferably the fog inhibitors which I propose to use are added to the emulsion after the formation of the silver halide crystals and prior to coating the emulsion. The inorganic acid salt may be added to the emulsion in solution in any convenient solvent not injurious to the emulsion such as water or lower alcohols.

The preparation of silver halide emulsions involves three separate operations: (1) the emulsification and digestion or ripening of the silver halide, (2) the freeing of the emulsion from aqueous soluble salts usually by washing, (3) the second digestion or after-ripening to obtain increased sensitivity (Mees, The Theory of the Photographic Process, 1942, page 3). The fog inhibiting agents are added, preferably after the final digestion.

The photographic emulsions which I use are of the silver bromoiodide developing-out type. It will be understood that this refers to mixed crystals of silver bromoiodide in which the upper limit of iodide is between 30 and 40 mol percent.

The emulsions may be chemically sensitized by any of the accepted procedures, in addition to or in combination with the sensitizing with the inorganic acid salts. The emulsions may be digested with naturally active gelatin, or sulfur compounds may be added such as those described in Sheppard U. S. Patents 1,574,944 and 1,623,499, and Sheppard and Brigham U. S. Patent 2,410,689.

The emulsions may also be treated with salts of the noble metals such as ruthenium, rhodium, palladium, iridium and platinum, all of which belong to group VIII of the periodic table of elements and have an atomic weight greater than 100. Representative compounds are ammonium chloropalladate, potassium chloroplatinate and sodium chloropalladite, which are used for sensitizing in amounts below that which produces any substantial fog inhibition, as described in Smith and Trivelli U. S. Patent 2,448,060, and as antifoggants in higher amounts, as described in Trivelli and Smith U. S. Patents 2,566,245 and 2,566,263.

The emulsions may also be chemically sensitized with gold salts as described in Waller and Dodd U. S. Patent 2,399,083, or stabilized with gold salts as described in Damschroder U. S. Patent 2,597,856 and Yutzy and Leermakers U. S. Patent 2,597,915. Suitable compounds are potassium chloroaurate, potassium aurithiocyanate, potassium chloroaurate, auric trichloride and 2-aurosulfobenzothiazole methochloride.

The emulsions may also be chemically sensitized with reducing agents such as stannous salts (Carroll U. S. Patent 2,487,850), polyamines such as diethylene triamine (Lowe and Jones U. S. Patent 2,518,698), polyamines such as spermine (Lowe and Allen U. S. Patent 2,521,925), or bis-(β-aminoethyl) sulfide and its water-soluble salts (Lowe and Jones U. S. Patent 2,521,926).

The emulsions may also be stabilized with the mercury compounds of Allen, Byers and Murray U. S. Patent 2,728,663, Carroll and Murray U. S. Patent 2,728,664, and Leubner and Murray U. S. Patent 2,728,665.

The inorganic salts are effective in the presence or absence of optical sensitizing dyes. Since optical sensitizing may affect stability of emulsions with respect to sensitivity, fog and latent image changes, the action of the compounds of this invention is not completely independent of optical sensitizing or other emulsion variables. I have found, however, that both unsensitized emulsions and emulsions sensitized with cyanine or merocyanine dyes or both may be treated with the inorganic acid salts and other addenda according to my invention.

The stabilizing action was determined by incubation of the emulsions usually for 1 or 2 weeks at 120° F. and constant humidity. The results of aging tests are tabulated in the examples and compare speed, gamma and fog of the emulsions with and without the stabilizing compound.

Example 1

One liter of a negative-speed gelatino-silver bromoiodide emulsion containing 0.24 mole of silver halide per liter was digested with a sulfur compound such as disclosed in Sheppard U. S. Patent 1,574,944 and potassium chloroaurate and panchromatically sensitized with cyanine dyes. To portions of the emulsion there were added the inorganic acid salts shown in the table and the various emulsions were coated on film base.

The coated emulsions were exposed on an Eastman Type Ib sensitometer and developed for 5 minutes at 68° F. in a developer of the following formula:

|  | Grams |
|---|---|
| N-methyl-p-aminophenol sulfate | 2.5 |
| Hydroquinone | 2.5 |
| Sodium sulfite (desiccated) | 30 |
| Sodium metaborate | 10 |
| Potassium bromide | 0.5 |
| Water to 1 liter. | |

The films with and without the various addenda were held at 120° F. and constant humidity for one week and were then exposed and developed as indicated. The results of tests for speed, gamma and fog before and after incubation of each of the samples were as follows:

| Compound | Agent per mole Ag halide, g. | Fresh Test ||| After Incubation |||
|---|---|---|---|---|---|---|---|
| | | Speed | Gamma | Fog | Speed | Gamma | Fog |
| Control | 0 | 7,200 | 0.90 | 0.10 | 1,850 | 0.65 | 0.36 |
| $CdCl_2$ | 19.0 | 6,550 | .87 | .08 | 4,850 | .92 | .11 |
| $Co(NO_3)_2 \cdot 6H_2O$ | 30 | 4,150 | .89 | .14 | 1,900 | .72 | .10 |
| $ZnSO_4 \cdot 7H_2O$ | 30 | 5,000 | .87 | .15 | 2,100 | .64 | .15 |
| $Zn(NO_3)_2 \cdot 6H_2O$ | 30 | 5,350 | 1.01 | .12 | 2,000 | .56 | .12 |
| $ZnCl_2$ | 15 | 5,350 | .91 | .12 | 2,800 | .80 | .12 |
| $MnSO_4 \cdot H_2O$ | 21 | 7,550 | .98 | .09 | 3,950 | .66 | .09 |
| $MnCl_2 \cdot 4H_2O$ | 21 | 7,050 | 1.02 | .09 | 6,900 | .75 | .09 |

Example 2

An emulsion was made as in Example 1 but containing 0.75 gram per gram mole of silver halide of the condensation product of 1 mole of oleyl alcohol with approximately 25 moles of ethylene oxide (polyethylene glycol oleyl ether). To portions of this emulsion the inorganic acid salts indicated in the table were added and coated on film base. The various emulsions with and without the addenda were exposed and developed as in Example 1 and readings were made for speed, gamma and fog before and after incubation of each of the samples for 2 weeks at 120° F. The results were as follows:

| Compound | Agent per mole Ag halide, g. | Fresh Test ||| After Incubation |||
|---|---|---|---|---|---|---|---|
| | | Speed | Gamma | Fog | Speed | Gamma | Fog |
| Control | 0 | 10,600 | 0.98 | 0.12 | 3,350 | 0.67 | 0.32 |
| $CdCl_2$ | 19.0 | 8,850 | .88 | .09 | 6,150 | .66 | .16 |
| $Co(NO_3)_2 \cdot 6H_2O$ | 30 | 7,550 | .90 | .16 | 3,600 | .58 | .12 |
| $ZnSO_4 \cdot 7H_2O$ | 30 | 7,350 | .94 | .15 | 4,250 | .56 | .15 |
| $Zn(NO_3)_2 \cdot 6H_2O$ | 30 | 8,250 | .98 | .14 | 3,700 | .63 | .12 |
| $ZnCl_2$ | 15 | 8,650 | .90 | .12 | 6,000 | .69 | .12 |
| $MnSO_4 \cdot H_2O$ | 21 | 9,500 | 1.04 | .10 | 3,950 | .66 | .10 |
| $MnCl_2 \cdot 4H_2O$ | 21 | 9,700 | 1.13 | .10 | 6,900 | .71 | .15 |

Example 3

An emulsion was made as in Example 1 but containing 0.6 gram per gram mole of silver halide of polyethylene glycol oleyl ether. To portions of this emulsion there were added the amounts of cadmium chloride or 4-hydroxy-6-methyl-1,3,3a,7-tetraazaindene, or cadmium chloride and the tetraazaindene, as shown in the following table. These coatings were tested for speed, gamma and fog before and after incubation for one week at 120° F. and the results were found to be as follows:

| Compound | Agent per mole Ag halide, g. | Fresh Test | | | After Incubation | | |
|---|---|---|---|---|---|---|---|
| | | Speed | Gamma | Fog | Speed | Gamma | Fog |
| Control | 0 | 8,250 | 1.11 | 0.16 | 5,450 | 0.76 | 0.26 |
| Tetraazaindene | 1.2 | 9,050 | 1.22 | .12 | 6,150 | .83 | .14 |
| CdCl₂ | 19.0 | 8,650 | 1.17 | .09 | 7,050 | 1.00 | .15 |
| { CdCl₂ + | 19.0 | 9,050 | 1.03 | .10 | 7,200 | .96 | .13 |
| { Tetraazaindene | 1.2 | | | | | | |

It is apparent from the data in the table that the speed, after incubation, of the emulsion containing both the cadmium chloride and the tetraazaindene is higher than the speed of the emulsion containing either the cadmium chloride or the tetraazaindene alone and that the fog is slightly lower.

Besides the cadmium, cobalt, manganese and zinc salts described above other salts have been found to be effective antifoggants. These include lead nitrate, calcium chloride, barium nitrate, magnesium nitrate, nickel acetate, strontium chloride, bismuth nitrate, beryllium fluoride, lithium sulfate and lithium acetate. Sodium sulfate and potassium sulfate have no antifoggant action under the conditions of my tests. Most of these antifoggants are effective in the range of concentrations indicated for the cadmium, cobalt, manganese and zinc salts but bismuth nitrate is very effective at levels of 0.15 to 0.3 gram per gram mole of silver halide.

Instead of incorporation in the silver halide emulsion the fog-inhibitors of my invention may be incorporated in a colloid layer such as a gelatin layer in contact with the emulsion.

The fog-inhibiting agents which I have described may be used in various kinds of photographic emulsions. In addition to being useful in non-sensitized emulsions they may also be used in orthochromatic, panchromatic and X-ray emulsions. If used with sensitizing dyes, they may be added to the emulsion before or after the dyes are added. The metal salts, with or without alkylene oxide polymers, may be used in emulsions intended for color photography, for example, emulsions containing color-forming couplers, emulsions to be developed by solutions containing couplers, or emulsions containing image-forming dyes bleachable by the silver-dye-bleach process. In addition to bromoiodide emulsions, the metal salts may be used in chlorobromide or chloroiodide emulsions, but are less effective when used in the latter kinds of emulsion.

The dispersing agents may be gelatin or other colloid such as collodion, albumen, cellulose derivatives or synthetic resins.

It will be understood that I contemplate as included within my invention all modifications and equivalents falling within the scope of the appended claims.

I claim:

1. A light-sensitive silver bromoiodide emulsion sensitized with sulfur compounds, gold salts and an ethylene oxide polymer having a molecular weight of at least 300, said emulsion containing an inorganic acid salt of cadmium as a fog inhibiting agent.

2. A light-sensitive silver bromoiodide emulsion sensitized with sulfur compounds, gold salts and polyethylene oxide oleyl ether, said emulsion containing $CdCl_2$ as a fog inhibiting agent.

3. A light-sensitive silver bromoiodide emulsion sensitized with sulfur compounds, gold salts and polyethylene oxide oleyl ether, said emulsion containing $CdCl_2$ and 4-hydroxy-6-methyl-1,3,3a,7-tetraazaindene as a fog inhibiting agent.

References Cited in the file of this patent

UNITED STATES PATENTS

| | | |
|---|---|---|
| 2,284,877 | Martinez | June 2, 1942 |
| 2,399,083 | Waller et al. | Apr. 23, 1946 |
| 2,423,549 | Blake et al. | July 8, 1947 |
| 2,432,865 | Dimsdale et al. | Dec. 16, 1947 |
| 2,441,389 | Blake | May 11, 1948 |
| 2,517,541 | Christensen | Aug. 8, 1950 |
| 2,598,079 | Stauffer et al. | May 27, 1952 |
| 2,618,556 | Hewitson et al. | Nov. 18, 1952 |
| 2,717,833 | Wark | Sept. 13, 1955 |